United States Patent [19]

Thoni

[11] Patent Number: 5,018,566
[45] Date of Patent: May 28, 1991

[54] MULTI-PART BOLTED STEEL RIM

[76] Inventor: Ludwig Thoni, 21 Hermann-Loens-Strasse, D-6701 Maxdorf-Birkenheide, Fed. Rep. of Germany

[21] Appl. No.: 454,916

[22] Filed: Dec. 22, 1989

[30] Foreign Application Priority Data

Dec. 30, 1988 [DE] Fed. Rep. of Germany ....... 3844329
Dec. 30, 1988 [DE] Fed. Rep. of Germany ....... 3844330
Dec. 30, 1988 [DE] Fed. Rep. of Germany ....... 3844331

[51] Int. Cl.⁵ .............................................. B60B 25/04
[52] U.S. Cl. .................................... 152/396; 152/405; 301/11 CD
[58] Field of Search ............... 152/396, 402, 405, 409, 152/411; 301/9 R, 10 R, 10 DC, 11 R, 11 CD, 63 R, 63 D, 95, 96, 97, 98, 99

[56] References Cited

U.S. PATENT DOCUMENTS

| | | | |
|---|---|---|---|
| 2,929,430 | 3/1960 | Sinclair et al. | 152/409 |
| 3,007,507 | 11/1961 | Sinclair et al. | 152/405 |
| 3,968,825 | 7/1976 | Mitchell et al. | 152/396 X |
| 4,466,670 | 8/1984 | Kaji | 301/11 CD |
| 4,770,220 | 9/1988 | Mori | 152/398 |
| 4,823,854 | 4/1989 | Payne et al. | 152/399 X |

FOREIGN PATENT DOCUMENTS

| | | | |
|---|---|---|---|
| 0284507 | 9/1988 | European Pat. Off. | 301/10 R |
| 2580550 | 10/1986 | France | 152/396 |
| 620353 | 3/1949 | United Kingdom | 152/405 |

Primary Examiner—Russell D. Stormer
Attorney, Agent, or Firm—Keil & Weinkauf

[57] ABSTRACT

A three-piece steel wheel rim for vehicle tires containing a front part, a center part, and a rear part. The front part and the rear part converge at the rear surfce of the center part and are bolted to the center part. Above the point of conversion, the rear part and the front part widen to form a V-shaped pocket which is partially closed by a rearwardly extending bulge on the front part. An O-ring is contained within the pocket. The center part may have a rearwardly extending support upon which the rear part may rest.

8 Claims, 2 Drawing Sheets

MULTI-PART BOLTED STEEL RIM

The present invention relates to multi-part steel rims comprising a central part of light alloy or steel, and a front and rear parts, bolted to the latter, which form the rim well and end on both sides in what is referred to as the rim flange, against which the side flanks of the tubeless tire rest in sealing fashion.

Rims of this kind are known, for example, from German Utility Model 8,025,900.

The advantage of using steel as compared to light alloys such as aluminum alloys is as follows. After casting, light alloy parts must be machined, i.e. smoothed down. Since they are corrosive, they must additionally be coated, this requiring an additional pretreatment. In contrast, the steel parts required here can be produced in one operation, e.g. by deep drawing.

However, compared to the light alloys used for rim production, steel has the disadvantage of higher deformability (ductility), for which reason they must have either thicker cross-sections and thus unacceptably higher weights or front and rear part must additionally be welded together, as a result of which, however, in the case of the stainless austenitic (nonrusting) steels particularly suitable for the present application, the increases in tensile strength caused, as is known, by the deformation processes are to a large extent cancelled out again.

For these reasons, it has hitherto been impossible to produce multi-part motor vehicle rims from stainless steel in light-weight construction, although there is great demand because of the attractive exterior, the low production costs and the low susceptibility to oxidation and corrosion.

A further serious problem consists in the fact that, because of the elasticity of the steel, reliable sealing in the case of tubeless tires has hitherto not been possible. The reason for this is that the movement of the front and rear parts to be connected to one another results in constant changes in load, and in friction, which produce abrasion and weaken compounds or O-rings used for sealing.

U.S. Pat. No. 4,466,670 discloses a three-part motor vehicle rim in which the front part can have a bulge pointing towards the inside of the rim. This rests on the rear part of the rim and with it forms a V-shaped groove into which sealing material is introduced.

Such a solution may be possible in the case of very rigid rim material but in the case of the considerably more elastic steel rims it is unsuitable. During driving, the groove would continuously open and close and, at the temperatures of up to well above 100° C. which furthermore occur, this would soon lead to leaking. In addition, front and rear part would constantly rub against each other, produce abrasion and weaken the structure, this incidentally, is also expected when standard light alloy is used, for which reason also this solution has not been adopted in industry.

It is an object of the present invention to provide a solution for the abovementioned problem, namely to make available steel rims which, in combination with low weight, have or surpass the mechanical properties known for light alloy rims and, as regards their surface properties, are of considerbly higher quality.

We have found that this object is achieved in a motor vehicle rim of the type described at the outset with the aid of the following features a) adjoining the joint, in cross-section, front part and rear part are widened in a V shape, forming a pocket with the inward-pointing bulge to accommodate an O-ring, b) above the bolt connection, the central part has a bevel against which rests the bent-down portion, provided for the formation of the V-shaped widening, of the rear part, c) a gap is left between bulge and rear part.

It has on the one hand been found that the mechanical load-bearing capacity of a rim structure of this kind in an extended-duration test (1000 km running distance under a load of 2000 Kg) is surprisingly high for a low overall weight, no damage resulting from deformation occurring. On the other hand, the seal proved to be permanently pressure-proof.

Due to the V-shaped design of the widening, the sealing O-ring is pressed into a narrower cross-section with increasing air pressure and the leakproofness is thus increased. In this arrangement, the bulge preferably protrudes inwards above the V limb of the rear part as far as a first region of its extension towards the rim flange.

Despite a light-weight construction, i.e. while having thin walls, the novel solution guarantees a dimensionally highly stable design of the 0-ring bed, since the unavoidable movements of the elastic material chosen relative to the front part are absorbed by the bulge while the vibrations of the rear part extend only as far as the upper line of contact on the bent-down portion. The O-ring thus remains unaffected by the work of deformation occurring during the rolling of the rim.

In this arrangement, the width of the gap is chosen so that, under normal loading it remains open and only closes in the event of any high impacts which may occur, in order to protect the 0-ring bed from deformation even during high impact.

Furthermore, the O-ring offers the important possibility of being used for prestressing and for supporting the parts statically relative to one another in such a way that a substantially stable spacing of the subregions from one another is guaranteed. For example, rubber rings with Shore hardnesses of 72 can be used here. Such a solution is not possible with sealing compounds.

In order to impart a prestress to the bolt connection and thereby secure it, it is furthermore proposed to make the front part and/or rear part slightly concave or convex in the region of the joint. By tightening the bolt connection, the joint is straightened under stress. Thus, in addition to the securing of the bolt connection, there arises a further prestress, which has the effect of limiting the spring action. Self-locking threads can of course additionally be used.

An additional increase in strength is achieved by a special shaping of the rear part. In cross-section, this has for this purpose, in a conventional manner, a step in the abovementioned extension adjoining the V profile, this step, as a transition, being designed with a slight oblique upward slope.

In a further development of the invention, a circumferential supporting collar is integrally formed on the central part.

This supporting collar can end in the region of the first extension but can preferably project into the region of the step or extend over the entire length of the latter. The additional weight of the supporting collar is compensated or more than compensated by the fact that, in this case, the rear part can be of considerably lighter construction.

Supporting elements of resilient material can be arranged on the supporting collar or between the supporting collar and the underside of the rear part, said supporting elements being brought into a press fit when the parts are bolted together.

These supporting elements can be one or more rubber rings of relatively high Shore hardness but, in principle, it is also possible to arrange between the faces rubber or plastic inserts (polyamide, polyurethane—also expanded polyurethane—silicone materials) covering certain areas or the entire surface.

Significant proportions of the bending elements occurring can be absorbed via the supporting collar and, in addition, the use of the resilient inserts results in a damping of rolling vibrations, leading to higher driving comfort and less noise.

The novel shaping of the rim well makes it possible for the first time to use stainless austenitic steels, e.g. material numbers 1.4301 or 1.4306 N, while satisfying high safety requirements.

In order to increase the life of the 0-ring sealing the rim well it is proposed to provide it with a silicone preservative.

Since, as mentioned, the novel rim well can be manufactured from relatively thin sheets, it is finally proposed to roll the valve hole (on the front part) on the inside or to produce it by stamping with the formation of a round collar since openings produced by ordinary boring can be subject to cracking because of the thin cross-sections.

In conclusion, it may be remarked that both the rim well and the central part together with the front part can be manufactured from steel or equivalent alloys. However, it is also possible within the scope of the present invention to use other materials for the central part.

Finally, it is also proposed to extend the bulge beyond the V-shaped widening, this bringing a further increase in the desired dimensional stability.

The present invention is explained in greater detail with reference to the attached figures.

Figure 1:
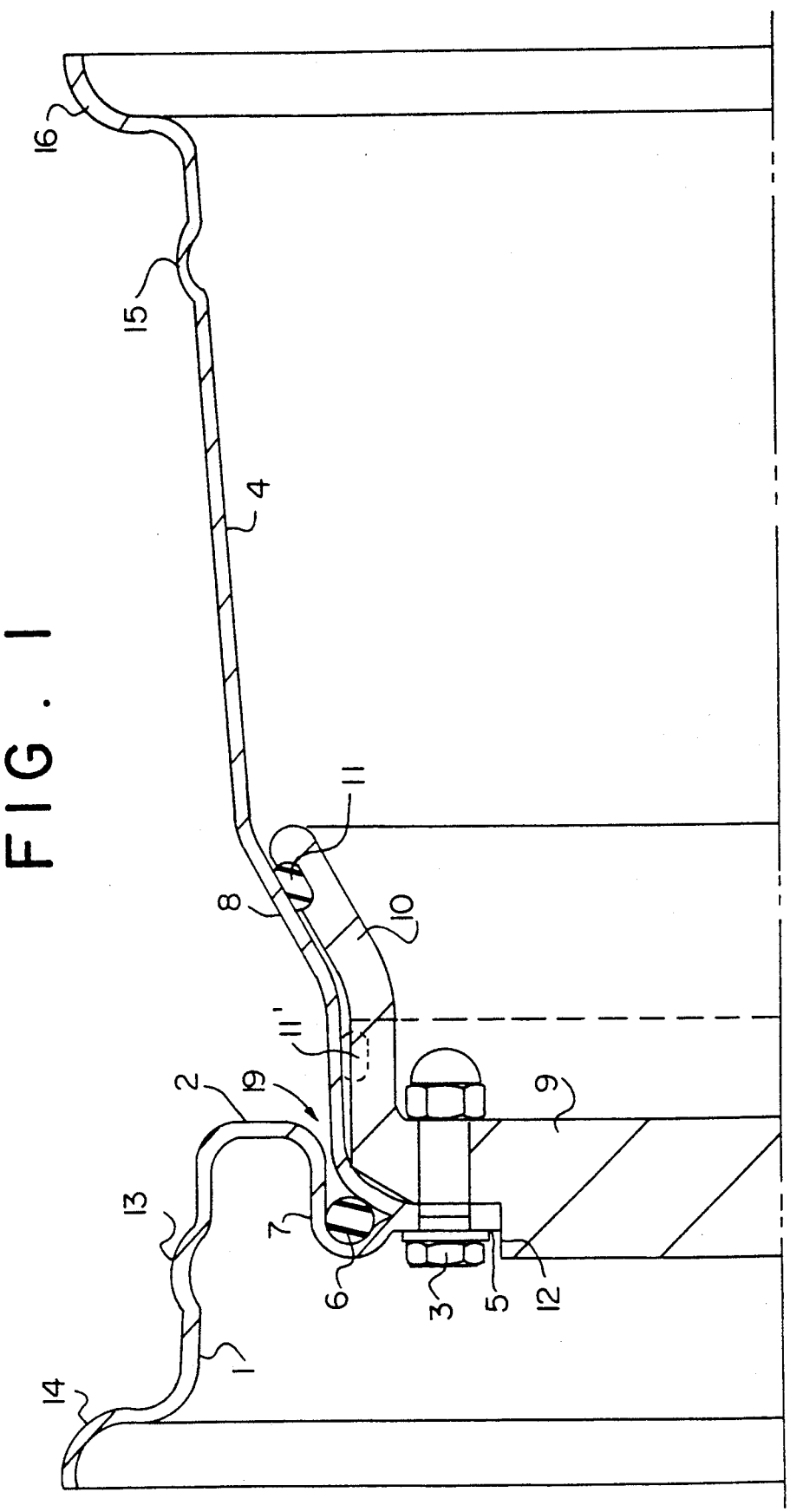
FIG. 1 shows an embodiment having a suppporting collar.

FIG. 1: The illustration shows an upper portion of a novel rim in cross-section. In this arrangement, the central part 9 supports the wheel bearing (not shown). In a step 12 are located, as joint 5, the lower profile sections of component parts forming a rim well, namely front part 1 and rear part 4. These are secured on the central part 9 with the aid of the bolt connection 3, which lies in a pitch circle, central part 9 and front part 1 enclosing the rear part 4. By means of special shaping of the joint, such as a concave or convex design, the bolt connection can be secured by stress.

The regions adjoining the joint 5 widen upwards in a V shape, the front part 1 being shaped to form a pocket 6 in which there rests an 0-ring 7 of sealing material, for example rubber, which towards the bottom rests against the flanks of the V-shaped widening. This 0-ring can be preserved with, for example, silicone. The opened-out flank of the rear part 4 rests as bent-down portion 17 against a bevel 18 of the central part 9 or against the angular or rounded transition of the latter to the horizontal.

The front part is bent at right angles to form the bulge 2, protruding beyond the pocket above the rear part 4 but preferably at least beyond the V-shaped widening. In the adjoining, approximately horizontal part there is a bead, and a rim flange 14 is shown at the outer edge. The rear part 4 has a region illustrated here as horizontal, adjoining which is the obliquely extending step 8. Integrally formed on the latter is a gently rising region having a further bead 15 and the inner rim flange 16. In this arrangement, a gap 19, which remains open under normal loading, is left between the bulge 2 and the rear part 4.

Illustrated below the horizontal region and the step 8 is the supporting collar 10, which here supports both parts. Analogous designs, such as, for example, a shortening of the supporting collar 10 (dashed line), are likewise embraced by the present invention. Supporting elements 11, 11' are shown between supporting collar 10 and rear part 4; these supporting elements can, if required, also be flat in shape.

Figure 2:
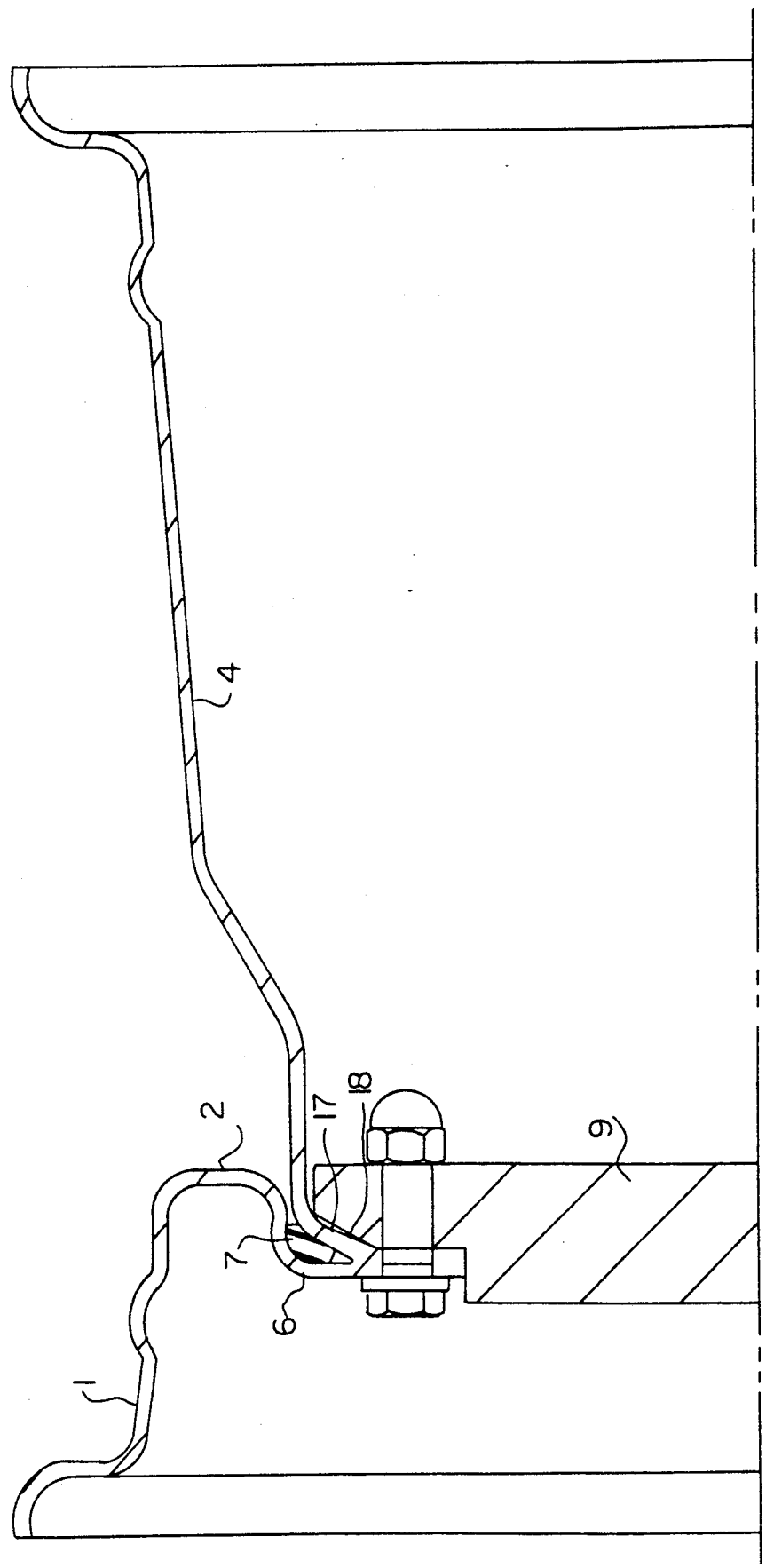
FIG. 2 shows an embodiment without a supporting collar.

FIG. 2 illustrates a design without a supporting collar. Here, the central part 9 ends radially under the rear part 4.

In this embodiment, a pocket 6 is shown which is obtained from an extension of the joint flank of the front part 1.

Adjoining the pocket in an S-shape is the bulge 2, the V-shaped gap for accommodating the 0-ring 7 here being formed solely by the bent-down portion 17 of the region 17 of the rear part 4 which adjoins the joint and, as in FIG. 1 rests against a bevel 18 of the central part 9.

We claim:

1. A multi-part motor vehicle wheel rim of lightweight construction, comprising a central part, a front part, and a rear part forming a rim well and having a seal, said front and rear parts having inwardly pointing, mutually touching, contact faces for the formation of a radial joint and being bolted to the central part forming a bolt connection, all three parts being constructed of steel and the front part having a bulge pointing towards the inside of the rim, wherein in the portion of the rim adjoining the joint, in cross-section, the front part and the rear part widen in a V shape so that there is formed an open pocket between the rear part and the inwardly pointing bulge of the front part, which pocket contains an O-ring, and a bent-down portion of the rear part rests against a bevel of the central part.

2. A wheel rim as described in claim 1, wherein in the region of the joint, the front part and/or the rear part contains a slightly concave shape.

3. A wheel rim as described in claim 1, wherein in the region of the joint, the front part and/or the rear part contains a slightly convex shape.

4. A wheel rim as described in claim 1, wherein a supporting collar for supporting the rear part is integrally formed on the central part.

5. A wheel rim as described in claim 4 wherein at least one resilient supporting element is arranged between the supporting collar and the rear part.

6. A wheel rim as described in claim 1 wherein the front part and the rear part are made of stainless austennitic steel.

7. A wheel rim as described in claim 1 wherein the O-ring is provided with a silicone preservative.

8. A wheel rim as described in claim 1 wherein the bulge of the front part is extended beyond the V-shaped widening.

* * * * *